US 11,491,425 B2

(12) United States Patent
Ardes

(10) Patent No.: US 11,491,425 B2
(45) Date of Patent: Nov. 8, 2022

(54) FLUID FILTER AND FILTER INSERT FOR THE SAME

(71) Applicant: Hengst SE, Muenster (DE)

(72) Inventor: Wilhelm Ardes, Ascheberg (DE)

(73) Assignee: Hengst SE, Muenster (DE)

( * ) Notice: Subject to any disclaimer, the term of this patent is extended or adjusted under 35 U.S.C. 154(b) by 674 days.

(21) Appl. No.: 15/755,820

(22) PCT Filed: Aug. 23, 2016

(86) PCT No.: PCT/EP2016/069896
§ 371 (c)(1),
(2) Date: Feb. 27, 2018

(87) PCT Pub. No.: WO2017/036856
PCT Pub. Date: Mar. 9, 2017

(65) Prior Publication Data
US 2018/0326333 A1    Nov. 15, 2018

(30) Foreign Application Priority Data

Aug. 28, 2015 (DE) .......................... 102015114315.1

(51) Int. Cl.
*F02M 37/42*         (2019.01)
*B01D 35/30*         (2006.01)
(Continued)

(52) U.S. Cl.
CPC .......... *B01D 35/153* (2013.01); *B01D 29/15* (2013.01); *B01D 35/147* (2013.01); *B01D 35/30* (2013.01);
(Continued)

(58) Field of Classification Search
CPC .... B01D 35/147; B01D 35/153; B01D 35/03; B01D 2201/316; B01D 2201/4092; F01M 11/03
See application file for complete search history.

(56) References Cited

U.S. PATENT DOCUMENTS

| 4,863,599 A | 9/1989 | Guenther et al. |
| 5,589,060 A * | 12/1996 | Gebert ................ B01D 24/004 |
|  |  | 210/130 |
| 2016/0220931 A1 | 8/2016 | Ardes |

FOREIGN PATENT DOCUMENTS

| DE | 569467 | 2/1933 |
| DE | 943643 | 11/1956 |

(Continued)

OTHER PUBLICATIONS

International Search Report, dated Nov. 18, 2016, priority document.

*Primary Examiner* — Patrick Orme
(74) *Attorney, Agent, or Firm* — Greer, Burns & Crain, Ltd.

(57) ABSTRACT

A fluid filter is mountable on a connection flange having a central stand pipe and an exchangeable filter insert. The insert has a hollow cylindrical filter material body with two end plates on its end faces and is mountable on the stand pipe. A cup-shaped screw housing of the filter can be screwed to a free end of the stand pipe, and supports a seal on a free edge thereof, via which the screw housing is sealable against a connection flange sealing surface when mounted. The filter has a first arrangement on an end face area to center the end face area to the flange. The filter insert has a second arrangement on the end face area outer periphery for centering the screw housing free edge relative to the
(Continued)

connection flange sealing surface. The second arrangement interacts in a centering manner with the screw housing free edge when installed.

12 Claims, 10 Drawing Sheets

(51) Int. Cl.
| | | |
|---|---|---|
| *F02M 37/48* | (2019.01) | |
| *B01D 35/153* | (2006.01) | |
| *B01D 29/15* | (2006.01) | |
| *B01D 35/147* | (2006.01) | |
| *F02M 37/36* | (2019.01) | |
| *F01M 11/03* | (2006.01) | |

(52) U.S. Cl.
CPC ....... *F02M 37/42* (2019.01); *B01D 2201/295* (2013.01); *B01D 2201/316* (2013.01); *B01D 2201/342* (2013.01); *B01D 2201/4046* (2013.01); *B01D 2201/4092* (2013.01); *F01M 11/03* (2013.01); *F02M 37/36* (2019.01); *F02M 37/48* (2019.01)

(56) References Cited

FOREIGN PATENT DOCUMENTS

| | | |
|---|---|---|
| DE | 3622154 | 5/1987 |
| EP | 2412417 | 2/2012 |
| FR | 25647 | 4/1923 |
| WO | 2015036107 | 3/2015 |

\* cited by examiner

FLUID FILTER AND FILTER INSERT FOR THE SAME

CROSS-REFERENCES TO RELATED APPLICATIONS

This application claims the benefit of the German patent application No. 10 2015 114 315.1 filed on Aug. 28, 2015, the entire disclosures of which are incorporated herein by way of reference.

BACKGROUND OF THE INVENTION

The present invention relates to a fluid filter that can be installed on a connecting flange having a central standpipe, the fluid filter having an exchangeable filter insert having a hollow cylindrical filter material body that is enclosed at its end faces by two end discs and that can be plugged onto the standpipe, and the fluid filter having a cup-shaped screw housing that has in the center of its base a screw threading that can be screwed to a counter-threading made on the free end of the standpipe and which has on its free end a seal by which the screw housing, in the mounted state, can be sealed against a sealing surface of the connecting flange. Moreover, the present invention relates to a filter insert for use in the fluid filter.

A fluid filter of the type described above is known, for example, from WO 2015/036 107 A1. In this known fluid filter, it has turned out that there is a danger of leaks occurring between the screw housing and the connecting flange, because when installing the filter on the connecting flange the free edge of the screw housing having the seal does not always come to lie precisely on the associated sealing surface, which in practice is often relatively narrow.

SUMMARY OF THE INVENTION

For the present invention, an object therefore arises of providing a fluid filter of the type described above that avoids the stated disadvantages of the existing art, and in which an improved precision is achieved of the positioning of the free edge of the screw housing and of the seal on the sealing surface of the connecting flange when installing the filter. Moreover, a suitable filter insert, fitting the filter and matched to it, is indicated.

The first part of the object, relating to the fluid filter, is achieved according to the present invention by a fluid filter of the type described above that is characterized in that the filter insert has, on its end face region facing the connecting flange in the installed state, first centering means for centering the end face region relative to the connecting flange, and that the filter insert has, on the outer periphery of its end face region facing the connecting flange in the installed state, second centering means for centering the free edge of the screw housing relative to the sealing surface of the connecting flange, the second centering means working together in centering fashion with the free edge of the screw housing in the installed state.

Advantageously, with the present invention it is achieved that during mounting of the fluid filter, the free edge of the screw housing always comes to lie on the associated sealing surface of the connecting flange with adequate precision without requiring special attention to be paid to this by the operating personnel. The desired exact positioning of the seal is ensured by the mutual centering of different parts of the fluid filter. Here, the starting point for the centering is always a part of the connecting flange, starting from which the mutual centering is continued, in the manner of a centering chain, via the filter insert up to the free edge of the screw housing having the seal.

There are various possibilities for the design of the fluid filter and the centering chain.

In a first embodiment, it is provided that a centering ring, stepped when seen in cross-section, is radially outwardly connected to or made in one piece with the end disc, facing the connecting flange in the installed state, of the filter insert, and that in the installed state of the filter insert, the centering ring engages in centering fashion in the connecting flange with a first ring part that points toward the connecting flange, and with a second ring part facing away from the connecting flange lies on the inner circumference of the free edge of the screw housing so as to center it relative to the sealing surface of the connecting flange. The stepped intermediate ring can here be made in one piece, or alternatively can be formed by two separate ring parts that are each themselves connected to or made in one piece with the end disc of the filter insert.

A second embodiment of the fluid filter according to the present invention provides that on the end disc, facing the connecting flange in the installed state, of the filter insert, a sealing lip that engages in the connecting flange in the installed state of the filter insert and seals and centers the filter insert relative to the connecting flange is attached or integrally formed in one piece radially inwardly, and radially outwardly a centering ring is attached or integrally formed in one piece, and that, in the installed state of the filter insert and when the screw housing is screwed on, the centering ring lies on the inner periphery of the free edge of the screw housing so as to center it relative to the sealing surface of the connecting flange.

A third embodiment of the fluid filter is characterized in that on the end disc, facing the connecting flange in the installed state, of the filter insert, a sealing lip that lies on the outer periphery of the standpipe in the installed state and seals and centers the filter insert relative to the standpipe is attached or integrally formed in one piece radially inwardly, and radially outwardly a centering ring is attached or integrally formed in one piece, and that, in the installed state of the filter insert and when the screw housing is screwed on, the centering ring lies against the inner periphery of the free edge of the screw housing so as to center it relative to the sealing surface of the connecting flange.

In a further embodiment of the fluid filter, it is provided that the fluid filter has a valve unit that forms a non-return valve and/or a filter bypass valve, the valve unit having a valve plate that sits in sealing fashion on the standpipe and whose basic shape is that of a circular annular disc, and that the valve plate has a concentric peripheral step or groove or rib on its side facing away from the connecting flange, and that on the end disc, facing the connecting flange in the installed state, of the filter insert, there is attached or integrally formed in one piece, a concentric ring structure that stands in engagement with the step or groove or rib in the installed state of the filter insert, and radially outwardly a centering ring is attached or integrally formed in one piece, and that, in the installed state of the filter insert and when the screw housing is screwed on, the centering ring lies on the inner periphery of the free edge of the screw housing so as to center it relative to the sealing surface of the connecting flange.

A final embodiment of the fluid filter with regard to the centering chain proposes that on the end disc, facing the connecting flange in the installed state, of the filter insert, a sealing lip that lies on an outer peripheral sealing area of the standpipe in the installed state of the filter insert and seals and centers the filter insert relative to the standpipe, or a sealing lip that engages in the connecting flange and seals and centers the filter insert relative to the connecting flange, is attached or integrally formed in one piece, and that radially outwardly a centering ring is attached on the end region, facing the connecting flange in the installed state, of the filter material body of the filter insert, and that, in the installed state of the filter insert and when the screw housing is screwed on, the centering ring lies on the inner periphery of the free edge of the screw housing so as to center it relative to the sealing surface of the connecting flange.

For all embodiments of the fluid filter indicated above, it is preferably provided that the centering ring has through-openings in order to enable an unhindered flow of fluid to the outer periphery of the filter material body of the filter when fluid to be filtered is supplied through the connecting flange.

A development in this regard provides that the through-openings in the centering ring are open towards the outer periphery of the centering ring. In this way, in particular, the manufacture of the centering ring is simplified.

The second part of the object, relating to the filter insert for use in the fluid filter, is achieved according to the present invention by a filter insert that is characterized in that it has, on its end face region facing the connecting flange in the installed state, first centering means by which the end face region can be centered relative to the connecting flange, and that the filter insert has, on the outer periphery of its end face region facing the connecting flange in the installed state, second centering means that, in the installed state of the filter insert, can be brought into centering engagement with the free edge of the screw housing in order to center the free edge of the screw housing relative to the sealing surface of the connecting flange.

The filter insert according to the present invention provides the means, matched to the rest of the fluid filter and to the connecting flange and working together with them, that are necessary to form a centering chain within the installed filter from the connecting flange via the filter insert up to the free edge of the screw housing having the seal.

The fluid filter and the associated filter insert according to the present invention are suitable for practically any filtering tasks; they are particularly advantageously used as an oil or fuel filter of an internal combustion engine of a motor vehicle.

BRIEF DESCRIPTION OF THE DRAWINGS

In the following, exemplary embodiments of the present invention are explained on the basis of a drawing.

DETAILED DESCRIPTION OF THE PREFERRED EMBODIMENTS

Figure 1:
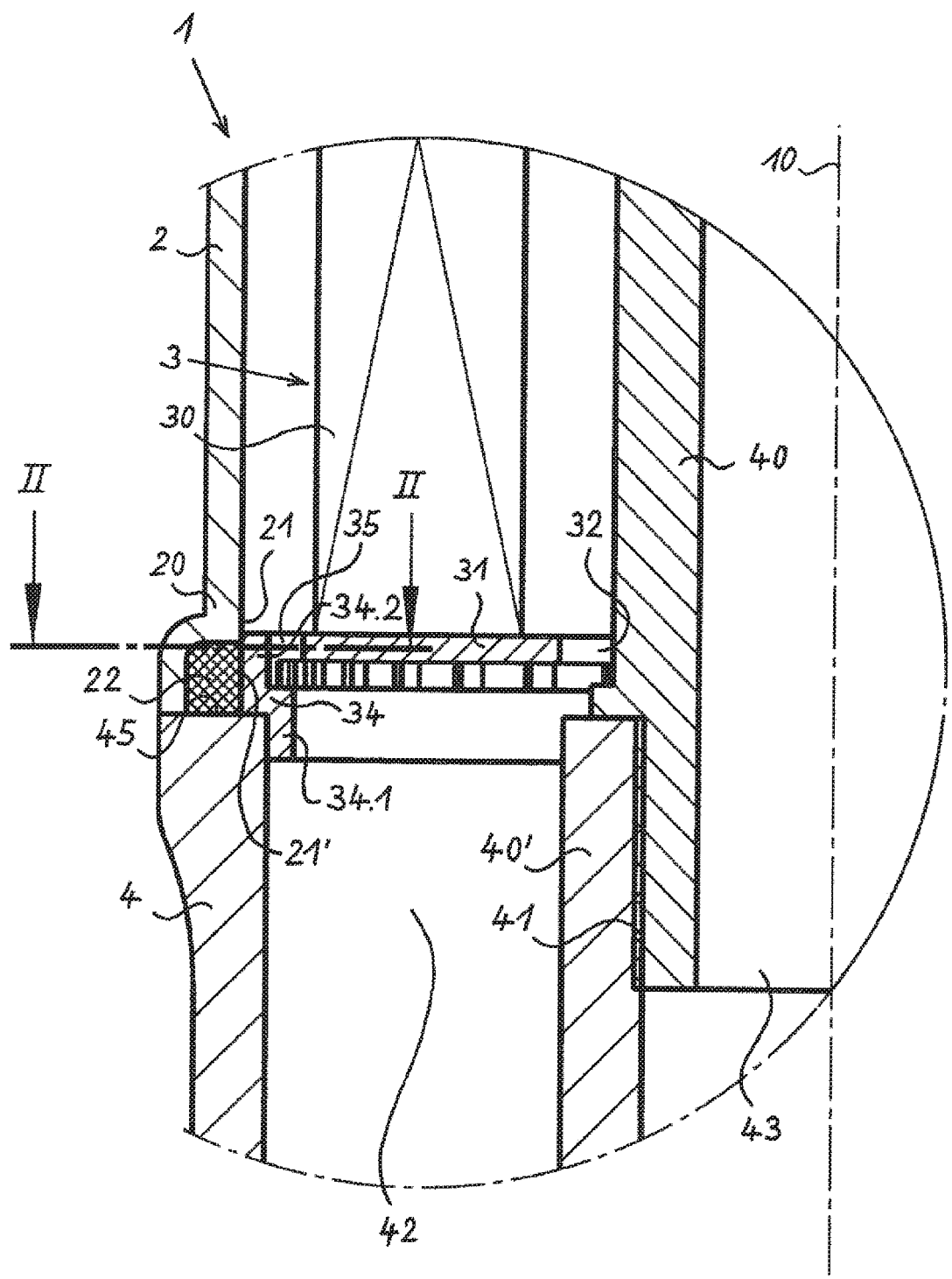
FIG. 1 shows a fluid filter having a filter insert, installed on a connecting flange, in a first embodiment, in a partial longitudinal section.

In the following description of the Figures, identical parts in the various drawings are always provided with the same reference characters, so that all the reference characters do not have to be explained again for each drawing.

All the fluid filters 1 described in the following have in common that the filter can be installed on, or in the drawings is installed on, a connecting flange 4 having a central standpipe 40, e.g., of an internal combustion engine. In each case, connecting flange 4 has a central pipe socket 40' onto which central standpipe 40 is screwed by a screw connection 41. Connecting flange 4 is made rotationally symmetrical to mid-axis 10, and has a radially outer fluid inlet channel 42 as well as a central fluid outlet channel 43 that runs partly through the interior of standpipe 40.

Fluid filter 1 has an exchangeable filter insert 3 having a hollow cylindrical filter material body 30 enclosed at its end faces by two end discs 31, and plugged onto standpipe 40 by means of a central perforation 32 in lower end disc 31 at the side of the connecting flange.

In addition, fluid filter 1 has a cup-shaped screw housing 2 that has, in the center of its base (not visible in the drawing; here at top) a screw threading that, in the assembled state shown in the drawing, is screwed to a counter-threading made on the free, upper end of standpipe 40, and which bears on its free, here lower edge 20 a seal 22 by which in the mounted state screw housing 2 is sealed against a sealing surface 45 of connecting flange 4.

The indications "at top" and "at bottom" relate only to the orientation of fluid filter 1 shown in the drawing; in practice, fluid filter 1 is capable of operation in any spatial orientation.

Both screw housing 2 and also filter insert 3 are also made rotationally symmetrical to mid-axis 10, as is known, so that here a merely partial representation of filter 1 in the figures of the drawing is adequate.

In practice, sealing surface 45 frequently has, as is shown in the drawing, the shape of a relatively narrow web, which requires a precise positioning of free edge 20 of screw housing 2 with seal 22. For this purpose, in general filter insert 3 has, on its end face region facing connecting flange 4 in the installed state, first centering means 33 or 34.1 or 36 for centering the end face region relative to connecting flange 4.

In addition, filter insert 3 has, on the outer periphery of its end face region facing connecting flange 4 in the installed state, second centering means 34 or 34.2 for centering free edge 20 of screw housing 2 relative to sealing surface 45 of connecting flange 4. Here, the two centering means 34, 34.2 of filter insert 3 work together, in the installed state, in centering fashion with free edge 20 of screw housing 2.

In FIGS. 1 through 10, five different embodiments of fluid filter 1 and of the respectively associated filter insert 3 are shown as examples, in each case on the basis of two drawings.

FIG. 1 shows a fluid filter 1 installed on connecting flange 4 with filter insert 3, in a first embodiment, in a partial longitudinal section. In this fluid filter 1, a centering ring 34, which is stepped seen in cross-section, is radially outwardly connected to or made in one piece with end disc 31, which faces connecting flange 4 in the installed state, of filter insert 3.

In the installed state of filter insert 3, centering ring 34 engages, with a first ring part 34.1 that points towards connecting flange 4 and has a smaller diameter, in centering fashion in connecting flange 4, here specifically in its fluid inlet channel 42. With a second ring part 34.2 that faces away from connecting flange 4 and has a larger diameter, centering ring 34 lies on inner circumference 21 of free edge 20 of screw housing 2 so as to center it relative to sealing surface 45 of connecting flange 4. In this way, seal 22 on free edge 20 of screw housing 2 is aligned precisely on sealing surface 45 of connecting flange 4.

Here, outer peripheral surface of first ring part 34.1 of centering ring 34 forms a radially inner support surface for the inner periphery of seal 22. Seal 22 is limited radially outwardly and axially at the top by free ends 20 of screw housing 2, so that in the depicted installed state seal 22 is pressed securely against sealing surface 45 in sealing fashion.

Figure 2:
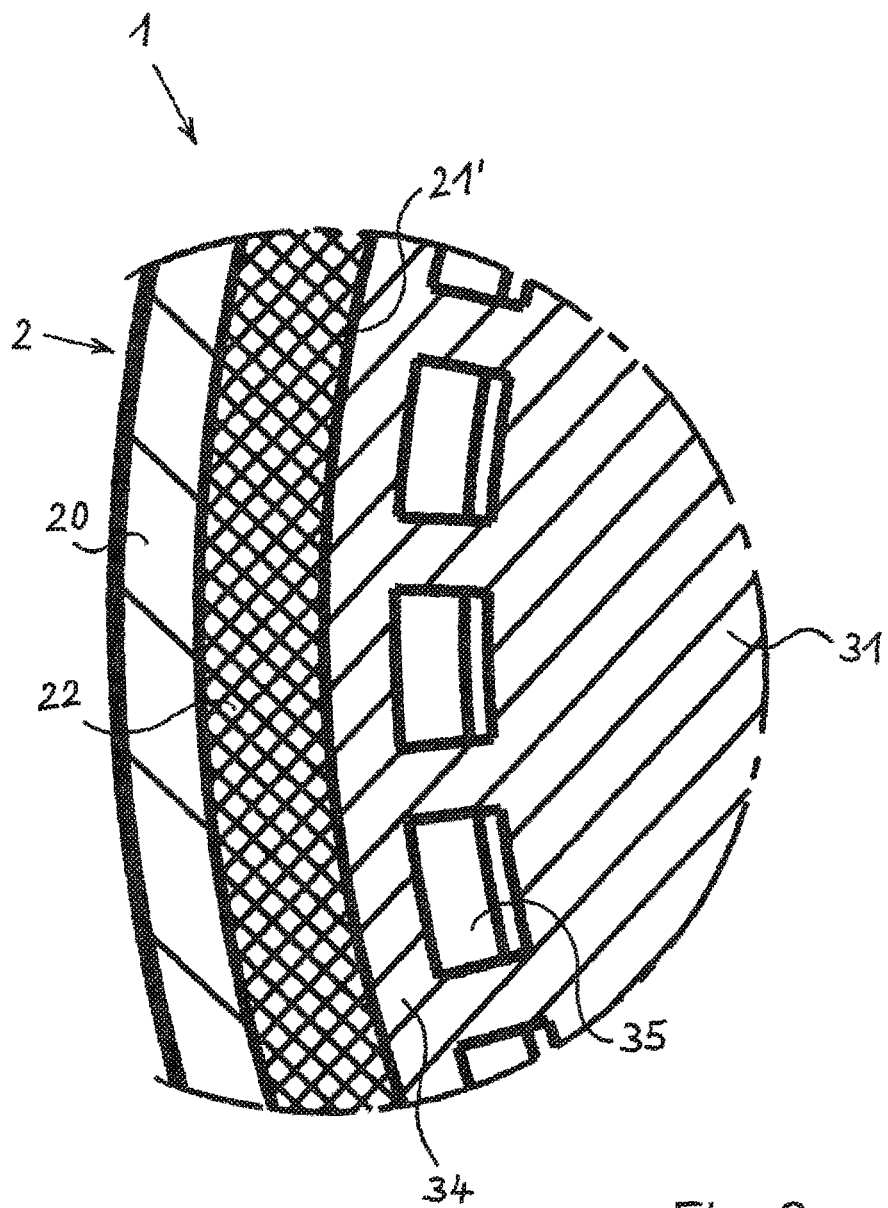
FIG. 2 shows the fluid filter of FIG. 1 in a partial cross-section along the sectional line II-II in FIG. 1.

FIG. 2 shows filter 1 of FIG. 1 in a partial cross-section according to sectional line II-II in FIG. 1. At left in FIG. 2, a part of screw housing 2, with its free edge 20, is visible. Radially inwardly, i.e., to the right in FIG. 2, from free edge 20 there runs seal 22. Centering ring 34 lies with its outer periphery on inner circumference 21' of seal 22. Here, centering ring 34 is made in one piece with an end disc 31 of filter insert 3 (not otherwise visible here). In order to enable a fluid flow, centering ring 34 is provided with a rim of through-openings 35, here situated inside centering ring 34.

Figure 3:
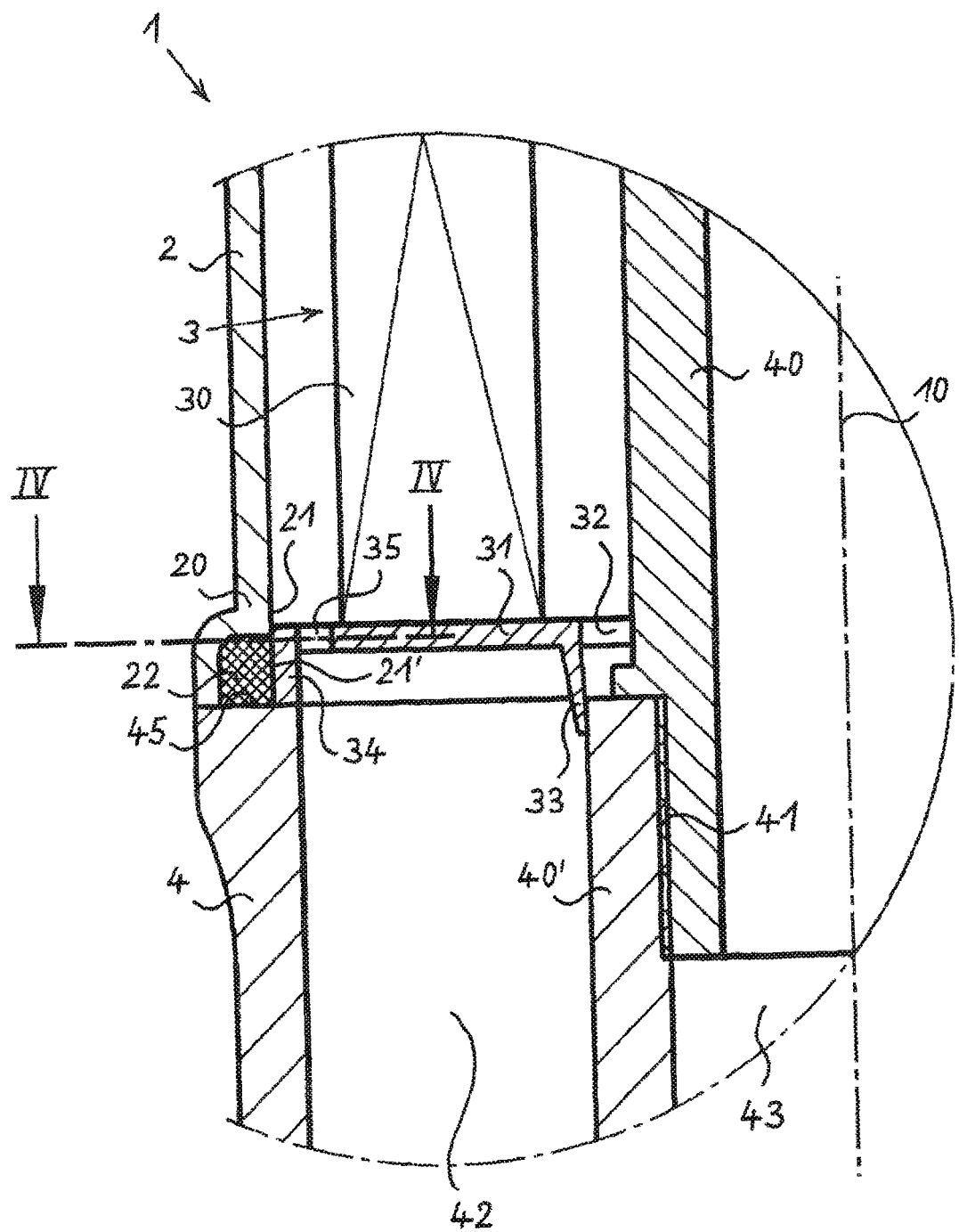
FIG. 3 shows the fluid filter with filter insert installed on a connecting flange, in a second embodiment, in a partial longitudinal section.

FIG. 3 shows filter 1 installed on a connecting flange 4 with filter insert 3 in a second embodiment, in a partial longitudinal section. Leading with its lower end disc 31 with its central perforation 32, filter insert 3 is plugged onto standpipe 40. On end disc 31, facing connecting flange 4 in the installed state, of filter insert 3, radially inwardly a sealing lip 33 is integrally formed in one piece that, in the installed state of filter insert 3, engages in connecting flange 4, here specifically in its fluid inlet channel 42, and seals and centers filter insert 3 relative to connecting flange 4.

Radially outwardly, a centering ring 34 is attached or integrally formed in one piece on end disc 31. In the installed state of filter insert 3, and when screw housing 2 is screwed on, centering ring 34 lies on inner periphery 21 of free edge 20 of screw housing 2 so as to center it relative to sealing surface 45 of connecting flange 4.

In order to support seal 22 radially inwardly, centering ring 34 extends further downward from end disc 31, up to sealing surface 45 of connecting flange 4.

Figure 4:
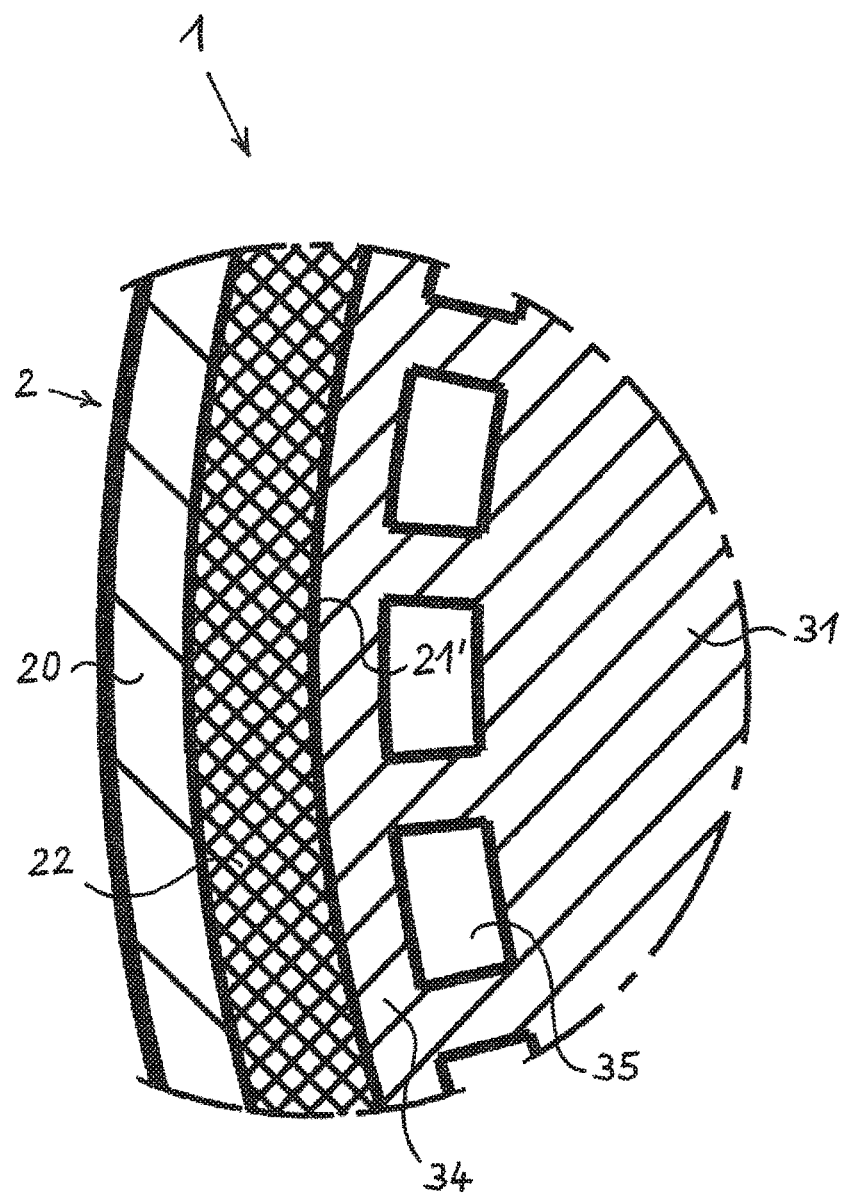
FIG. 4 shows the fluid filter of FIG. 2 in a partial cross-section along the sectional line IV-IV in FIG. 3.

FIG. 4 shows filter 1 of FIG. 3 in a partial cross-section along sectional line IV-IV in FIG. 3. At left in FIG. 4, a part of screw housing 2, with its free edge 20, can be seen. Radially inward, i.e., to the right in FIG. 4, from free edge 20 there runs seal 22. On inner periphery 21' of said seal, centering ring 34 is situated with its outer periphery. Centering ring 34 is here again made in one piece with an end disc 31 of filter insert 3, and is also again provided with a rim of through-openings 35 situated within centering ring 34.

Figure 5:
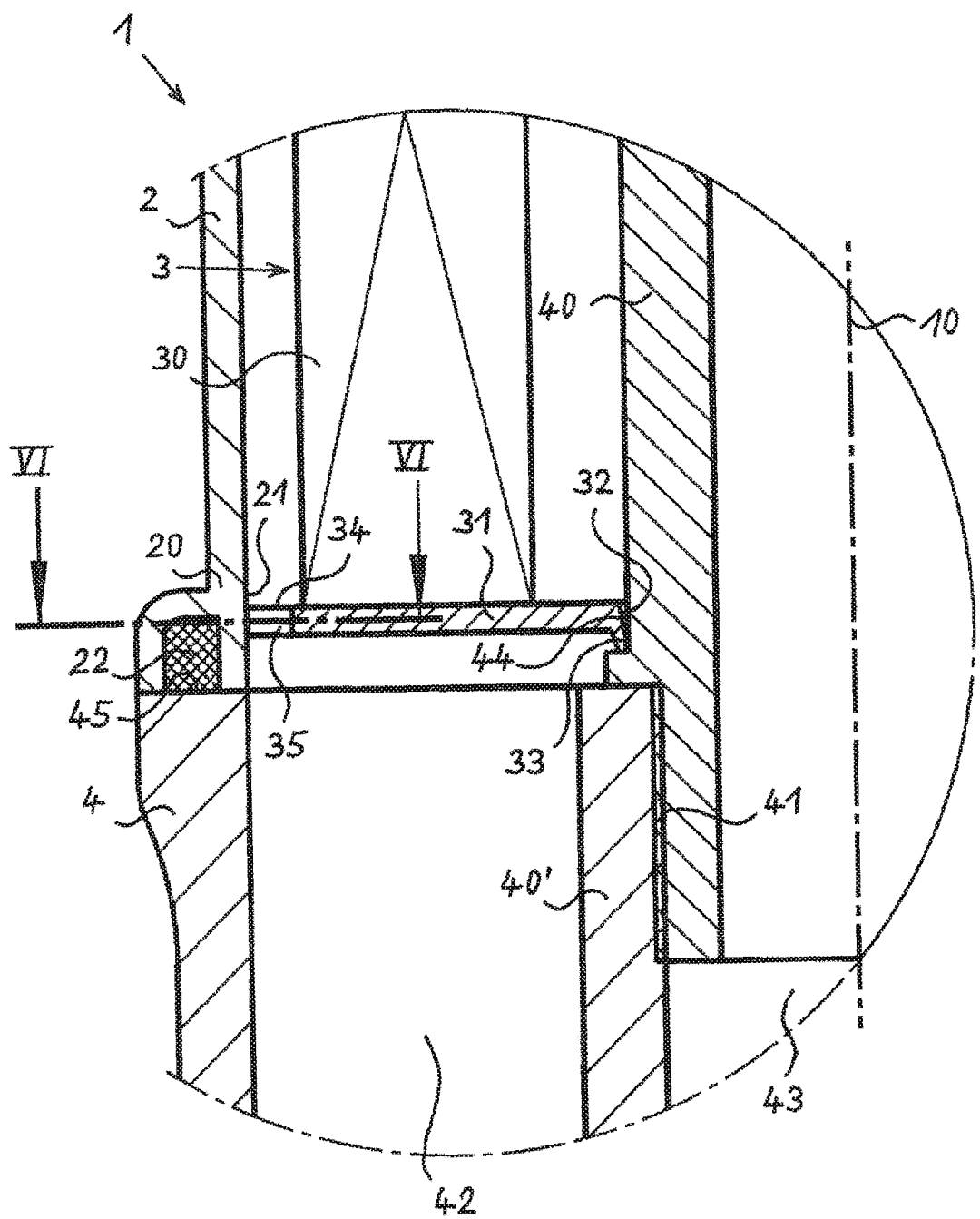
FIG. 5 shows the fluid filter with filter insert, installed on a connecting flange, in a third embodiment, in a partial longitudinal section.

FIG. 5 shows filter 1 installed on a connecting flange 4, with filter insert 3, in a third embodiment in a partial longitudinal section. On end disc 31, facing connecting flange 4 in the installed state, of filter insert 3, radially inwardly a sealing lip 33 is integrally formed in one piece that, in the installed state of filter insert 3, lies on the outer periphery of standpipe 40 and seals and centers filter insert 3 relative to standpipe 40. Radially outwardly on end disc 31, a centering ring 34 is attached or integrally formed in one piece. In the installed state of the filter insert 3, and when screw housing 2 is screwed on, centering ring 34 lies on inner periphery 21 of free edge 20 of screw housing 2 so as to center it relative to sealing surface 45 of connecting flange 4.

Here, seal 22 is situated in an open groove that points downward, i.e., towards sealing surface 45 of connecting flange 4, and is thus enclosed on three sides by open edge 20 of screw housing 2. In this way, even in the assembled state, as shown in FIG. 5, seal 22 cannot deviate, but rather is pressed reliably onto sealing surface 45.

Figure 6:
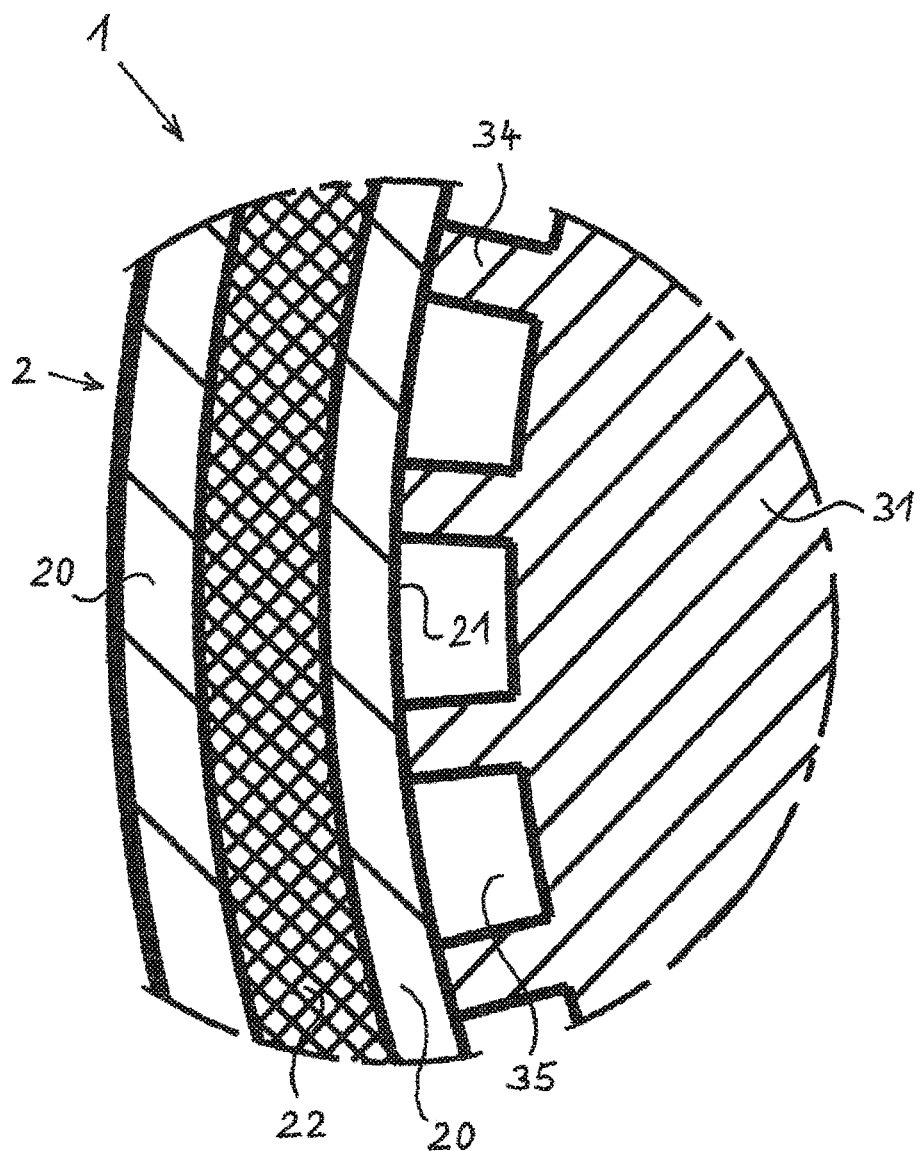
FIG. 6 shows the fluid filter of FIG. 5 in a partial cross-section along sectional line VI-VI in FIG. 5.

FIG. 6 shows filter 1 of FIG. 5 in a partial cross-section along sectional line VI-VI in FIG. 5. At left in FIG. 6, a part of screw housing 2 is visible, with its free edge 20. Radially inwardly, i.e., to the right in FIG. 6, from free edge 20 there runs seal 22. Radially inward from seal 22, a radially inner part of free edge 20 of screw housing 2 is visible. Centering ring 34 lies with its outer periphery on the inner periphery 21 of said housing. Here, centering ring 34 is again made in one piece with end disc 31 of filter insert 3, and is again provided with a rim of through-openings 35, which here however are open towards the outer periphery of centering ring 34.

Figure 7:
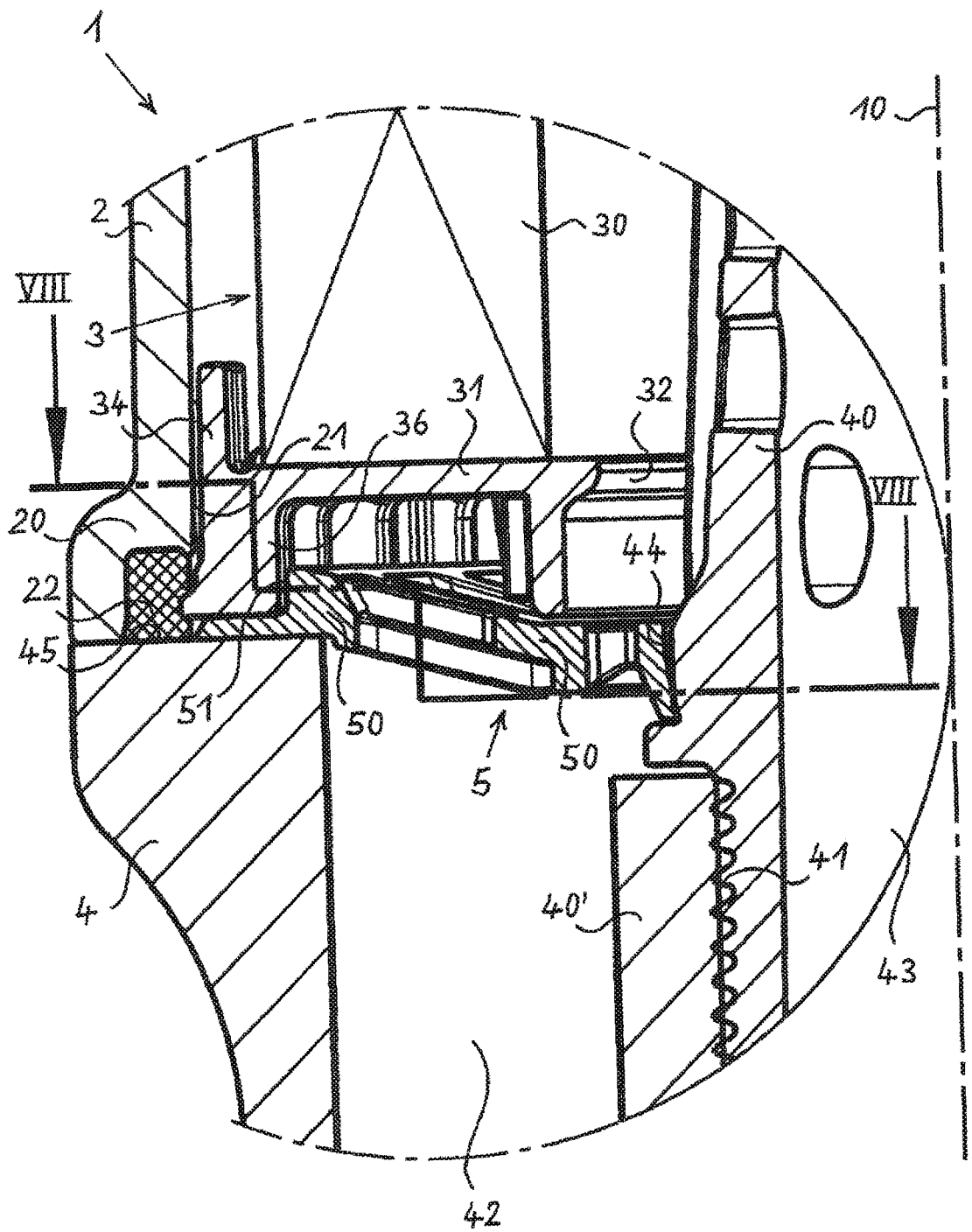
FIG. 7 shows the fluid filter with filter insert installed on a connecting flange, in a fourth embodiment, in a partial longitudinal section.

FIG. 7 shows filter 1 installed on a connecting flange 4 with filter insert 3, in a fourth embodiment, in a partial longitudinal section. Here, fluid filter 1 has a valve unit 5, forming a non-return valve and/or a filter bypass valve, having a valve plate 50 that is seated in sealing fashion on standpipe 40 and whose basic shape is that of a circular annular disc. Valve plate 50 has, on its side facing away from connecting flange 4, a concentrically peripheral step 51 or groove or rib. On end disc 31, facing connecting flange 4 in the installed state, of filter insert 3, a concentric ring structure 36 is integrally formed in one piece that engages with the step 51 or groove or rib.

A centering ring 34 is attached or integrally formed in one piece radially outwardly on end disc 31. In the installed state of filter insert 3, and when screw housing 2 is screwed on, centering ring 34 lies on inner periphery 21 of free edge 20 of screw housing 2 so as to center it relative to sealing surface 45 of connecting flange 4.

Here, seal 22 is compelled to be positioned precisely relative to the associated sealing surface 45. Axially upwardly, and radially outwardly, seal 22 is enclosed by free edge 20 of screw housing 2. Radially inwardly, seal 22 is for the most part enclosed by a region of centering ring 34 that extends in the direction towards sealing surface 45. Here, another flat flange part of valve plate 50, whose outer periphery forms a lower part of the radially inner enclosure for seal 22, is situated between a lower end face of centering ring 34 and sealing surface 45 of connecting flange 4.

Figure 8:
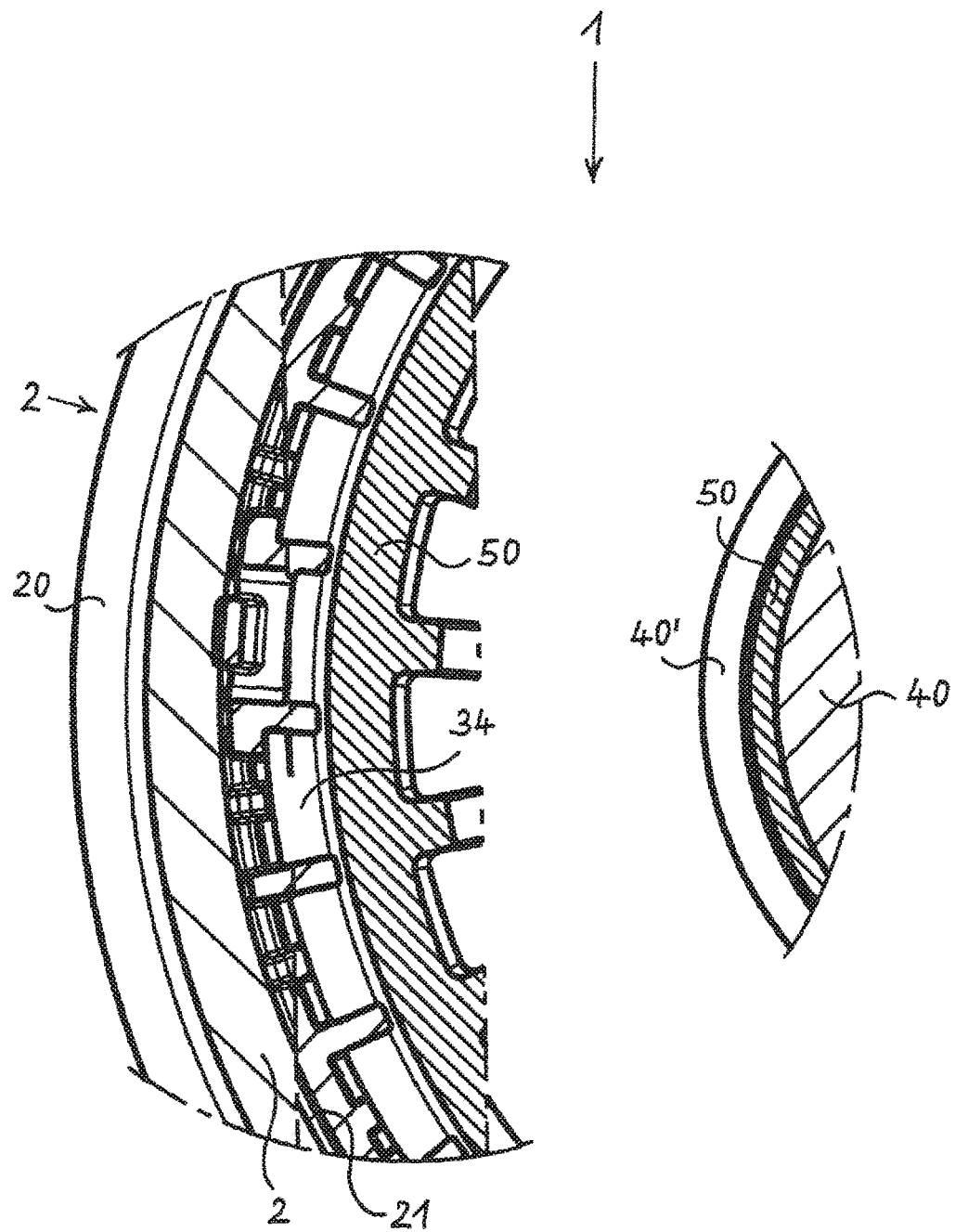
FIG. 8 shows the fluid filter of FIG. 7 in a partial cross-section along the sectional line VIII-VIII in FIG. 7.

FIG. 8 shows filter 1 of FIG. 7 in a partial cross-section along sectional line VIII-VIII in FIG. 7. At left in FIG. 8, a part of screw housing 2, with its free edge 20, can be seen. Radially inwardly, i.e., to the right in FIG. 8, from free edge 20 there runs centering ring 34. Seal 22 is here below the sectional plane and is therefore not visible.

Radially inward from centering ring 34, valve plate 50 can be seen, provided with valve openings (not provided with reference characters). Further to the right, i.e., further radially inward, in FIG. 8 the radially outer part of the upper end of pipe socket 40' of connecting flange 4 is visible. Radially inward from pipe socket 40', valve plate 50 is again sectioned, now in its radially innermost edge region. At the far right in FIG. 8, finally, a part of central standpipe 40 is visible in section.

Figure 9:
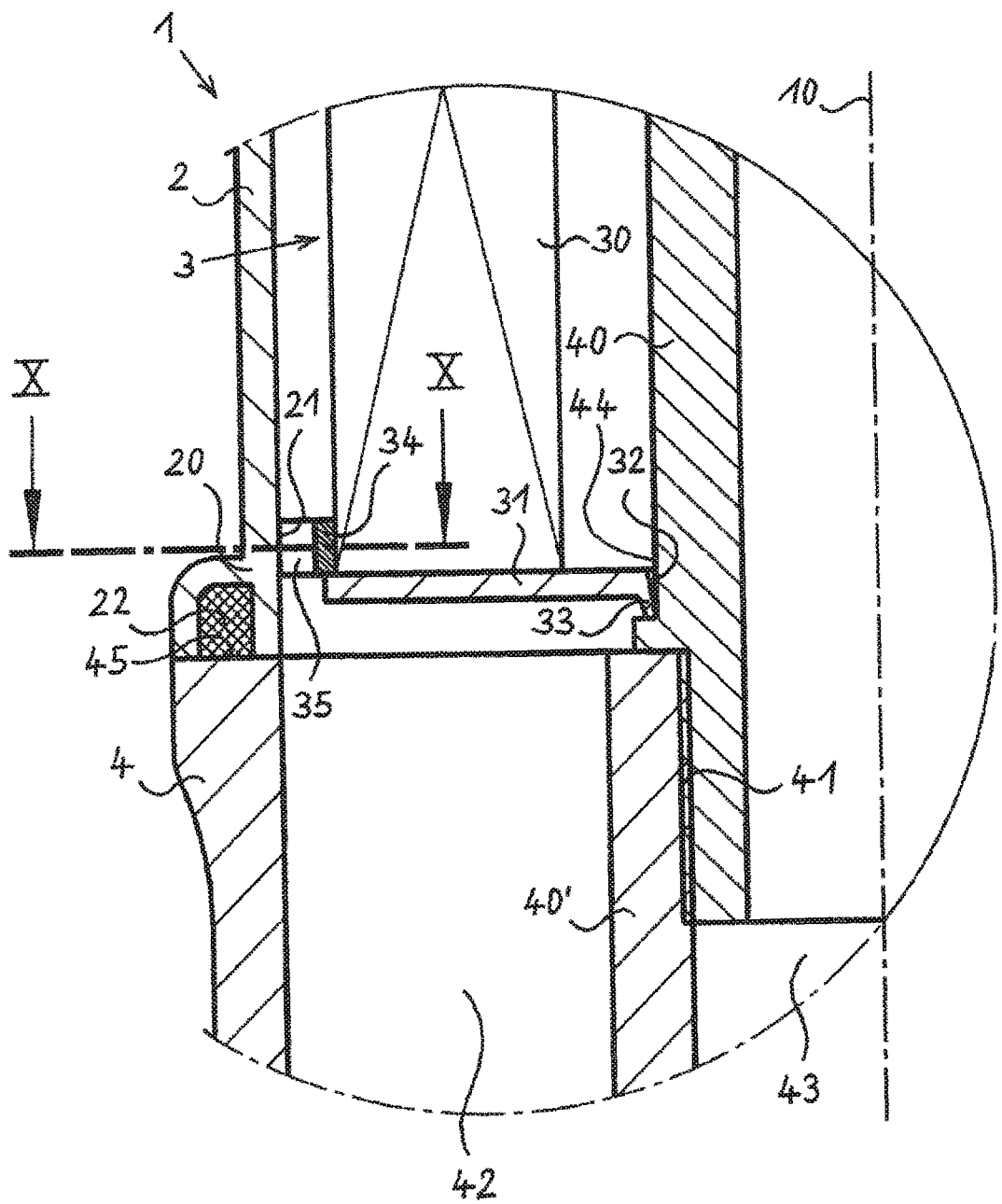
FIG. 9 shows the fluid filter with filter insert installed on a connecting flange, in a fifth embodiment, in a partial longitudinal section.

FIG. 9 shows filter 1 installed on a connecting flange 4 with filter insert 3, in a fifth embodiment, again in a partial longitudinal section. On end disc 31, facing connecting flange 4 in the installed state, of filter insert 3, radially inwardly a sealing lip 33 is integrally formed in one piece that, in the installed state of filter insert 3, lies on an outer peripheral sealing region 44 of standpipe 40 and seals and centers filter insert 3 relative to standpipe 40.

A centering ring 34 is attached radially outwardly on the end region, facing connecting flange 4 in the installed state, of filter material body 30. In the installed state of filter insert 3, and when screw housing 2 is screwed on, centering ring 34 lies on inner periphery 21 of free edge 20 of screw housing 2 so as to center it relative to sealing surface 45 of connecting flange 4.

Centering ring 34, attached on filter material body 30 of filter insert 3, can be glued or welded or clamped to filter material body 30, so that centering ring 34 securely maintains its desired axial position close to or immediately on lower end disc 31 during assembly of filter 1. Alternatively or in addition, here centering ring 34 can be connected at the radially inner region of its lower end face to the radially outer end region of end disc 31, for example by welding or gluing.

Here, seal 22 is situated in an open groove, pointing downward, i.e., towards sealing surface 45 of connecting flange 4, in edge 20 of screw housing 2, and is thus enclosed on three sides by free edge 20 of screw housing 2. In this way, in the installed state, as shown in FIG. 9, seal 22 cannot deviate, but rather is pressed onto sealing surface 45 reliably and with a precise position.

To enable a fluid flow from fluid inlet channel 42 to the outer periphery of filter material body 30, centering ring 34 here again has axial through-openings 35.

Figure 10:
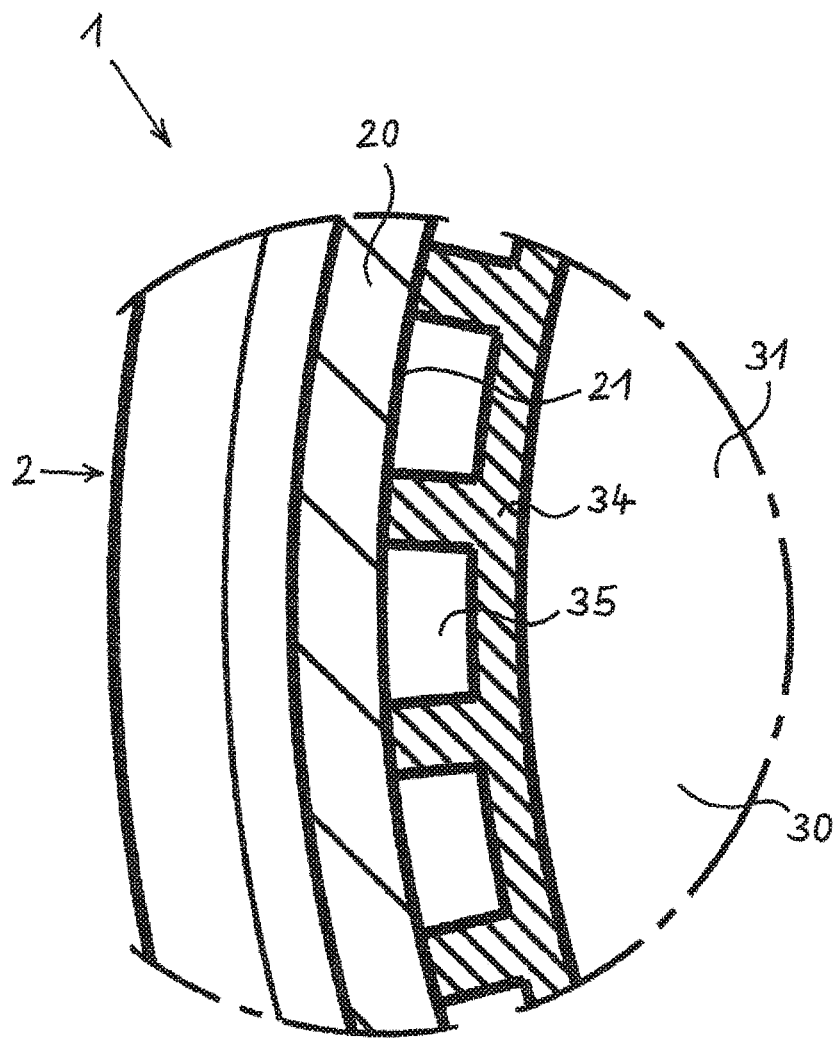
FIG. 10 shows the fluid filter of FIG. 9 in a partial cross-section along sectional line X-X in FIG. 9.

Finally, FIG. 10 shows filter 1 of FIG. 9 in a partial cross-section along sectional line X-X in FIG. 9. At left in FIG. 10, a part of screw housing 2, with its free edge 20, can be seen. Radially inward, i.e., to the right in FIG. 10, from free edge 20 there runs centering ring 34, lying on inner periphery 21 of edge 20 so as to center it, and here having radially outwardly open through-openings 35. Here, seal 22 is below the sectional plane and is therefore not visible. Radially inward from centering ring 34, a part of lower end disc 31, with filter material body 30 of filter insert 3, is visible.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS 1 fluid filter
10 mid-axis
2 screw housing
20 free edge of 2
21 inner periphery of 20
21' inner periphery of 22
22 seal on 20
3 filter insert
30 filter material body
32 end disc
32 central perforation in 31
33 sealing lip on 32
34 centering ring
34.1, 34.2 ring parts of 34
35 through-openings in 34
36 ring structure on 31
4 connecting flange
40 central standpipe
40' pipe socket
41 screw connection
42 fluid inlet channel
43 fluid return channel
44 outer peripheral sealing region of 40
45 sealing surface on 4 for 22
5 valve unit
50 valve plate
51 step on 50

The invention claimed is:

1. A fluid filter configured to be installed on a connecting flange having a central standpipe, the fluid filter comprising
   an exchangeable filter insert having a hollow cylindrical filter material body enclosed at two end faces by two end discs, the filter material body being pluggable onto the standpipe, and
   a housing covering at least an outer periphery of the hollow cylindrical filter material body having in the center of a base a screw threading that can be screwed to a counter-threading made on a free end of the standpipe, and bearing on a free edge a seal by which the housing, in an installed state, can be sealed against a sealing surface of the connecting flange,
   wherein the filter insert has, on an end face region facing the connecting flange in the installed state, first centering means for centering the end face region relative to the connecting flange, and
   wherein the filter insert has, on an outer periphery of the end face region facing the connecting flange in the installed state, second centering means for centering the free edge of the housing relative to the sealing surface of the connecting flange, the second centering means interacting, in the installed state, in centering fashion with the free edge of the housing.

2. The fluid filter as recited in claim 1, wherein the first and second centering means each comprise, respectively, a different part of a centering ring, which is stepped seen in cross-section, is connected to or made in one piece with one of the two end discs, facing the connecting flange in the installed state, of the filter insert, and wherein in the installed state of the filter insert the centering ring engages, with a first ring part of the centering ring pointing toward the connecting flange, in centering fashion in the connecting flange, and lies, with a second ring part of the centering ring facing away from the connecting flange, on an inner periphery of the free edge of the housing so as to center a free end of the housing relative to the sealing surface of the connecting flange.

3. The fluid filter as recited in claim 2, wherein the centering ring has through-openings.

4. The fluid filter as recited in claim 3, wherein the through-openings in the centering ring are open toward an outer periphery of the centering ring.

5. The fluid filter as recited in claim 1, wherein the first centering means comprise, on one of the two end discs, facing the connecting flange in the installed state, of the filter insert, a sealing lip that engages in the connecting flange in the installed state of the filter insert and seals and centers the filter insert relative to the connecting flange is attached or integrally formed in one piece radially inwardly, and wherein the second centering means comprise, radially outwardly, a centering ring attached or integrally formed in one piece, and wherein, in the installed state of the filter insert and when the housing is screwed on, the centering ring lies on an inner periphery of the free edge of the housing so as to center a free end of the screw housing relative to the sealing surface of the connecting flange.

6. The fluid filter as recited in claim 1, wherein the first centering means comprise, on one of the two end discs, facing the connecting flange in the installed state, of the filter insert, a sealing lip that lies on the outer periphery of the standpipe in the installed state and seals and centers the filter insert relative to the standpipe is attached or integrally formed in one piece radially inwardly, and, wherein the second centering means comprise, radially outwardly, a centering ring attached or integrally formed in one piece, and wherein, in the installed state of the filter insert and when the housing is screwed on, the centering ring lies on an inner periphery of the free edge of the housing so as to center a free end of the housing relative to the sealing surface of the connecting flange.

7. The fluid filter as recited in claim 1, wherein the fluid filter has a valve unit that forms at least one of a non-return valve or a filter bypass valve, the valve unit having a valve plate that sits in sealing fashion on the standpipe and whose basic shape is that of a circular annular disc, and wherein the valve plate has a concentric peripheral step or groove or rib on a side facing away from the connecting flange, and wherein the first centering means comprise, on one of the two end discs, facing the connecting flange in the installed state, of the filter insert, a concentric ring structure that stands in engagement with the step or groove or rib in the installed state of the filter insert, and wherein the second centering means comprise, radially outwardly, a centering ring attached or integrally formed in one piece, and wherein, in the installed state of the filter insert and when the screw housing is screwed on, the centering ring lies on an inner periphery of the free edge of the screw housing so as to center a free end of the housing relative to the sealing surface of the connecting flange.

8. The fluid filter as recited in claim 1, wherein the first centering mean comprise, on one of the two end discs, facing the connecting flange in the installed state, of the filter insert, a sealing lip that lies on an outer peripheral sealing area of the standpipe in the installed state of the filter insert and seals and centers the filter insert relative to the standpipe, or a sealing lip that engages in the connecting flange and seals and centers the filter insert relative to the connecting flange, is attached or integrally formed in one piece radially inwardly, and wherein the second centering mean comprise, radially outwardly, a centering ring attached on an end region, facing the connecting flange in the installed state, of the hollow cylindrical filter material body of the filter insert, and wherein, in the installed state of the filter insert and when the screw housing is screwed on, the centering ring lies on the inner periphery of the free edge of the housing so as to center a free end of the housing relative to the sealing surface of the connecting flange.

9. A filter insert for use in a fluid filter that is configured to be installed on a connecting flange having a central standpipe, and having a housing and having in the center of a base a screw threading that can be screwed to a counter-threading made on a free end of the standpipe, and bearing on a free edge a seal by which the housing, in an installed state, can be sealed against a sealing surface of the connecting flange, the filter insert comprising:

a hollow cylindrical filter material body enclosed at two end faces by two end discs, on an outer periphery end face region of one of the two end discs facing the connecting flange in the installed state, first centering means by which the end face region is configured to be centered relative to the connecting flange, and on the outer periphery end face region facing the connecting flange in the installed state, second centering means that, in the installed state of the filter insert, are configured to be brought into centering engagement with the free edge of the housing in order to center the free edge of the housing relative to the sealing surface of the connecting flange.

10. The filter insert as recited in claim 9, wherein the first and the second centering means each comprise, respectively, a different part of a centering ring which is radially outwardly attached to, or integrally formed on, the one of the two end discs, and wherein in the installed state of the filter insert and when the housing is screwed on, the centering ring can be placed onto the inner periphery of the free edge of the housing so as to center the free edge of the housing relative to the sealing surface of the connecting flange.

11. The filter insert as recited in claim 10, wherein the centering ring has through-openings.

12. The filter insert as recited in claim 11, wherein the through-openings in the centering ring are open toward an outer periphery of the centering ring.

\* \* \* \* \*